Patented Aug. 8, 1933

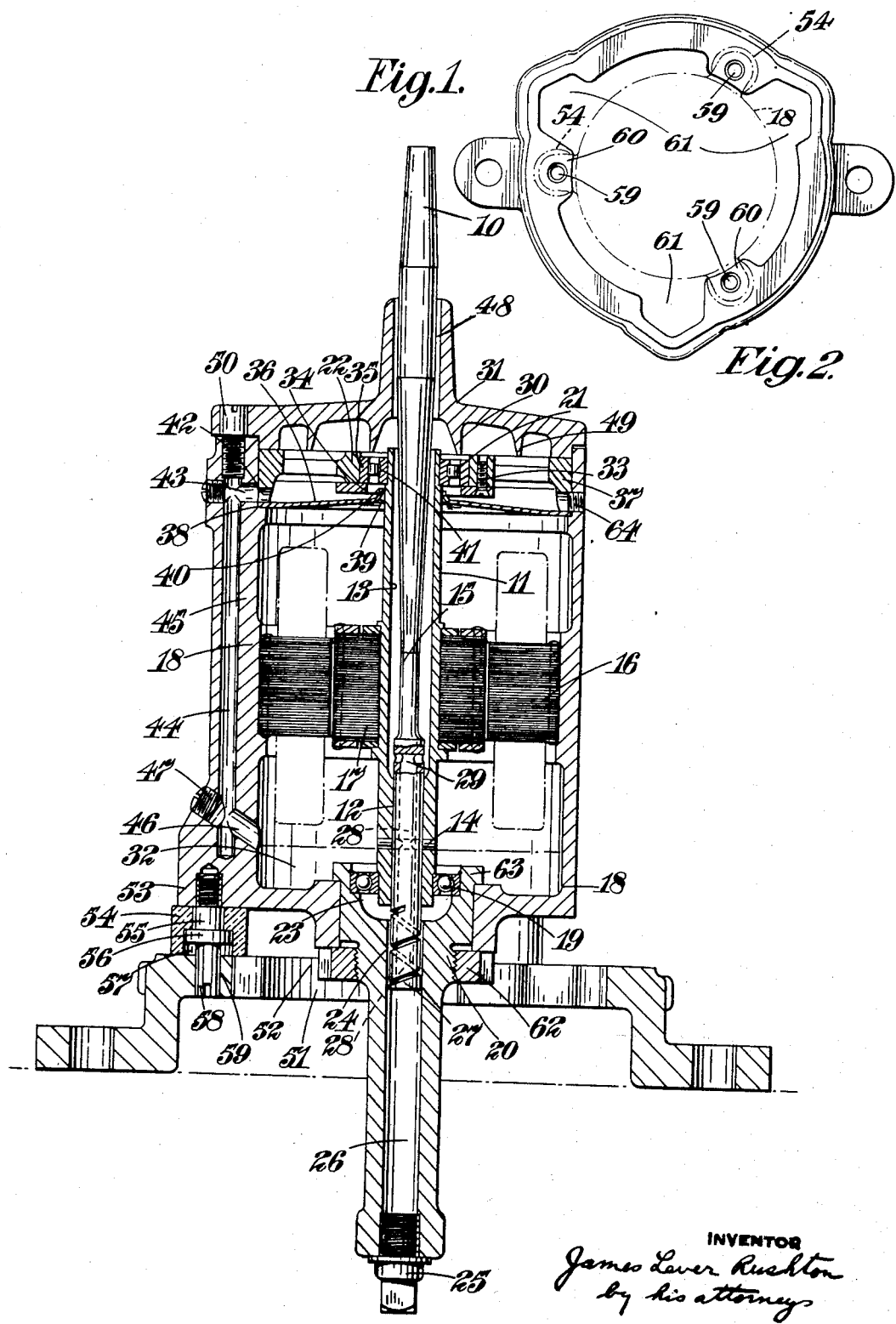

1,921,842

UNITED STATES PATENT OFFICE 1,921,842

CENTRIFUGAL MACHINE

James Lever Rushton, Bolton, England, assignor to Dobson & Barlow Limited, Bolton, England, a British Company Application October 21, 1929, Serial No. 401,324, and in Great Britain April 18, 1929

3 Claims. (Cl. 308—170)

This invention relates to a centrifugal machine, particularly a rayon spinning machine, wherein a vertical self-centering spindle is mounted within a driven hollow shaft so as to be driven thereby.

Heretofore, the lubrication of high speed vertical spindles has usually been effected solely by centrifugal and capillary action which may be suitable for relatively small quantities of lubricant, but when a much greater weight of lubricant has to be raised against the resistance of fluid friction over a relatively large area, viz., the interior surface of a hollow shaft and the exterior surface of a tapered portion of the spindle, it has been found that the centrifugal and capillary action are insufficient in themselves, at the required spindle speeds, to create the continuous and steady flow of lubricant which is necessary to force the lubricant upwards through a continuous lubrication system in a predetermined and regular quantity. It has been found necessary to provide more positive means for ensuring the circulation of the lubricant, and this is done, according to the invention, by producing oil-pressure in an oil-pressure chamber by means of the rotating spindle for ensuring a positively forced circulation of lubricant.

In other words, according to the present invention, a centrifugal machine of the type described above is characterized in that a chamber for lubricant under pressure is arranged in a continuous lubrication system for lubricating the various bearings of the machine, into which chamber lubricant is forced under pressure by the rotation of the spindle, and from which chamber lubricant is caused to flow upwards under pressure in the spindle. and on leaving the latter returns to the oil-pressure chamber. This arrangement enables a considerable quantity of lubricant to be kept in continuous circulation against the opposing action of resistance due to fluid friction and bearings through which the lubricant is caused to flow, so that a continuous and steady flow of liquid is ensured under severe working conditions.

When the centrifugal machine has upper and lower bearings for the spindle, according to another feature of the invention, the oil-pressure chamber is located below the lower bearing and serves to force lubricant to the upper bearing, to which it may overflow from the top of the hollow shaft.

The invention thus provides a centrifugal machine comprising, in combination, a casing having a base portion constituting a reservoir for lubricant, a vertical hollow shaft having an upper and a lower bearing in the casing, a self-centering spindle mounted within said hollow shaft and coupled therewith so as to be driven thereby, said casing having an auxiliary chamber for liquid under pressure situated below said reservoir, and a closed lubricating system comprising the hollow shaft for supplying lubricant to the upper bearing, a duct for supplying lubricant from the latter to said reservoir, and means rotatable with said hollow shaft for supplying lubricant under pressure downwards by way of the lower bearing from said reservoir to said auxiliary chamber and from the latter up the hollow shaft.

For a more complete understanding of the invention one embodiment applied to a centrifugal machine for spinning rayon, will now be described, by way of example, with reference to the accompanying drawing, in which:—

Figure 1 is a sectional elevation of the machine with the spinning cup omitted, and Figure 2 is a plan of the base-plate.

Like reference numerals indicate like parts in both figures.

A vertical flexible spindle 10 which carries at its upper end a spinning cup (not shown) is arranged centrally within and projects beyond both ends of a hollow shaft 11. The bore of said shaft is stepped to form two portions 12, 13 of different internal diameters, the portion 12 being of less diameter than the portion 13 and at the lower end of the shaft. The lower end of the spindle 10 is a tight fit in the portion 12 of the bore of the shaft 11 to which the spindle is secured by a pin 14 so as to be driven by said shaft. The spindle intermediate of its ends is reduced in diameter as shown at 15 to provide the desired flexibility of the spindle as a whole. The hollow shaft 11 surrounds said reduced portion of the spindle 10 and the diameter of the bored portion 13 is such that sufficient clearance is provided between the spindle and the shaft to permit lateral movement of the spindle and circulation of the lubricant as hereinafter described.

The shaft 11 is driven by means of an electric motor 16 whereof the rotor 17 is secured to said shaft intermediate of its ends. The motor is mounted within a substantially cylindrical casing 18 provided at any convenient position with an aperture (not shown) for the insertion of the cable.

The hollow shaft 11 below the rotor 17 rotates in a ball bearing 19 mounted in a cylindrical footstep 20 arranged in the base of the casing 18. At its upper end said shaft rotates in a roller bearing 21 carried by a housing 22 which is removably mounted in the upper end of said casing. The races of these ball and roller bearings are seated upon shoulders provided on the parts whereby said races are carried and they are held in position by suitably arranged split rings so as to support the hollow shaft vertically.

The lubrication of the rotating members is effected by providing a reservoir 32 for lubricant in the lower part of the casing 18. The lubricant from said reservoir can percolate through the ball bearing 19 to a cavity 23 in the footstep 20. The lower end of the spindle 10 which protrudes from the shaft 11 extends into a bore 24 in said footstep, which bore is of slightly greater diameter than the spindle so as to leave a small clearance between the rotating spindle and the stationary footstep. The lower end of the bore 24 is closed by a plug 25 arranged so as to provide an auxiliary chamber 26 between it and the lower end of the spindle 10. A helical groove 27 is formed on said protruding portion of the spindle 10 and is so arranged that when said spindle is rotating lubricant will be forced from the cavity 23 into the oil pressure chamber 26, into which the lower end of the spindle 10 extends. The said spindle has at its lower end a central longitudinal passage 28 and as the spindle continues to rotate the pressure in the chamber 26 increases and lubricant is forced up said longitudinal passage. This passage communicates at its upper end through transverse openings 29 in the spindle 10 with the annular space between said spindle and the hollow shaft 11. When the spindle is rotating lubricant will be forced by centrifugal action outwardly through the openings 29 into said annular space. The lubricant is forced upwardly in said annular space to the upper end of the hollow shaft when it overflows on to the roller bearing 21 but is constrained from spreading by a depending baffle 30 on a removable cap 31 which closes the upper end of the casing 18. Secured to the underside of the housing 22 by screws 33 is an annular ring 34 the inside edge of which corresponds approximately with the inside edge of the outer fixed race ring 35 of the roller bearing 21. A conical shield 36 is arranged below said roller bearing to protect the windings of the motor from lubricant and so as to cause the lubricant to flow outwardly towards a depending rim 37 on the housing 22. The said shield is secured at its outer edge between the lower edge of said depending rim and a shoulder 38 on the interior wall of the casing 18, and has a central aperture 39 through which the hollow shaft 11 passes. The diameter of said aperture is slightly greater in diameter (say by about $\frac{1}{16}$ of an inch) than said shaft so as to permit of any slight displacement which may tend to bring the said shield and shaft into contact when the latter is rotating. The edge of the shield which forms the aperture 39 is bent upwardly to provide a lip 40, the top edge of which is in close proximity to the underside edge of the inner rotating race ring 41 of the roller bearing 21 but so disposed as to ensure clearance between it and any moving parts.

The lubricant which flows over the upper edge of the hollow shaft 11 percolates directly through the roller bearing 21, or is thrown by centrifugal force against the baffle 30 which eventually deflects the lubricant on to the roller bearing. On leaving said bearing the lubricant enters the passage formed by the inner edge of the ring 34 and the outer face of the lip 40, after which it falls onto the shield 36 which is shaped to provide a gradient which together with the effect of the centrifugal force assists the flow of the lubricant towards the depending rim 37 on the housing 22. The possibility of lubricant falling between the shield 36 and the hollow shaft 11 on to the windings of the motor 16 is remote as the tendency is for the lubricant to be thrown out radially from the time it leaves the upper end of the hollow shaft and during its course through the bearing 21.

The rim 37 is provided with one or more horizontally arranged outlet passages 42 which communicate with similar horizontal passages 43 formed in the interior wall of the casing 18. The latter horizontal passages communicate with vertical passages 44 provided in enlarged portions 45 of the wall of the casing 18, through which vertical passages the lubricant flows back to the reservoir 32 in the lower part of the casing. Each vertical passage 44 opens into an inclined feed passage 46 in the casing 18 closed by a plug 47. This feed passage provides access to the interior of the casing 18 for renewing the lubricant supply in the reservoir 32, and the lubricant cannot escape from said reservoir when the plug 47 is removed provided the level of the lubricant is kept below the head of the plug.

The cap 31 which closes the upper end of the casing 18 has an upwardly-extending boss 48 surrounding the spindle 10 with sufficient clearance to permit lateral movement of the latter, and also has a second depending baffle flange 49 located to constrain any lubricant thrown out by the roller bearing 21 or other rotating parts and which escapes the baffle 30 so as to prevent any creeping of the lubricant towards the outer joint between the casing and the cap 31. The said removable cap is held in position by means of screws 50 which are screw into the upper ends of the enlarged portions 45 of the casing. The cap 31 serves also to retain the housing 22 in position.

The parts hereinbefore described are mounted as a unit above an aperture 51 in a base-plate 52 attached to the spindle beam, through which aperture the unit can be lowered clear of any overhead tackle or gear. To this end, the base of the casing 18 is provided with three bosses 53 arranged at equal distances apart around the casing, which bosses rest on rubber bushes 54. Each bush is secured to the casing by means of a stud 55 screwed into a boss 53 and provided with a head 56 which is received in an aperture 57 in the underside of the bush. The stud 55 is also provided with an extension which acts as a dowel pin 58 and fits into a corresponding hole 59 in a boss 60 on the base-plate reaching into the aperture 51 therein. In order to remove the complete unit, it is raised until the dowel pins 58 are clear of the base-plate, after which by turning the unit through an angle of about 20° it may be lowered through the aperture 51, suitably shaped recesses 61 being provided in the base-plate to permit the passage of the bushes 54 and bosses 53. Thus, it will be appreciated that the said dowel pins constitute locating devices for the complete unit.

The construction hereinbefore described presents the further advantage that the spindle 10, hollow shaft 11, rotor 17, together with the footstep 20, housing 22, and the bearings 19 and 21 can be removed from the casing as a unit assemblage. This operation can be effected by removing the screws 50 whereby the cap 31 is secured to the casing, unscrewing a nut 62 whereby the footstep 20 is secured in the base of the casing, and removing a grub screw 64 which locates the housing 22 of the bearing 21. When said screws and nuts have been released and the cap 31 taken off, the unit assemblage aforesaid can be removed bodily through the upper end of the casing.

Before removing the assemblage aforesaid from the casing, as much lubricant as possible is drained from the unit by removing the plug 25. It will be seen, however, that some lubricant will still be retained in the reservoir 32 due to the fact that the upper end 63 of the footstep 20 is above the base of the reservoir. By this construction it is intended that any impurities which may settle in the sump thus formed will be kept from the bearing 19 and can only be removed by dismantling the unit.

The invention is not restricted to the precise constructional details described as various modifications can be made therein without departing from the invention.

I claim:

1. A centrifugal machine comprising, in combination, a casing having a base portion constituting a reservoir for lubricant, a vertical hollow shaft having an upper and a lower bearing in the casing, a self-centering spindle mounted within said hollow shaft so as to provide an annular space within the upper part of the hollow shaft, means coupling the spindle with the shaft so as to be driven by it, said casing having an auxiliary chamber and a closed lubricating system comprising the hollow shaft for supplying lubricant to the upper bearing, a duct for supplying lubricant from the latter to said reservoir and means rotatable with said hollow shaft for supplying lubricant by way of the lower bearing from said reservoir to said auxiliary chamber, and up the hollow shaft, which means is constituted by the lower part of said spindle extending into said auxiliary chamber, which lower part of the spindle is hollow and opens into said annular space and is provided with an external helical groove for connecting said reservoir with said auxiliary chamber.

2. A centrifugal machine comprising, in combination, a casing having a base-portion constituting a reservoir for lubricant, a vertical hollow shaft having an upper and a lower bearing in the casing, a self-centering spindle mounted within said hollow shaft so as to provide an annular space within the upper part of the hollow shaft, means coupling the spindle with the shaft so as to be driven by it, a removable footstep mounted in the base-portion and carrying the lower bearing, which footstep is bored to provide an auxiliary chamber into which the lower part of said spindle extends, which lower part is hollow and opens into said annular space and has a helical groove for connecting said reservoir with said auxiliary chamber by way of the lower bearing, and a closed lubricating system comprising said helical groove, said auxiliary chamber, the lower hollow part of said spindle, the hollow shaft for supplying lubricant to the upper bearing, and a duct for supplying lubricant from the latter to said reservoir.

3. A centrifugal machine comprising, in combination, a casing which is open at its upper end, a housing mounted at the upper end of said casing, an anti-friction bearing in said housing, a second bearing removably mounted in said casing towards its lower end, a vertical hollow shaft carried by the latter bearing and journaled in said anti-friction bearing, a self-centering spindle mounted within said hollow shaft and coupled therewith so as to be driven thereby, a removable cap closing the upper end of the casing and having one or more baffle flanges depending from the underside thereof, said casing having below said lower bearing an auxiliary chamber for liquid under pressure, and a closed lubricating system comprising the hollow shaft for supplying lubricant to the upper bearing, a duct for supplying lubricant from the latter to said reservoir and means rotatable with said hollow shaft for supplying lubricant by way of the lower bearing from said reservoir to said auxiliary chamber and up the hollow shaft.

JAMES LEVER RUSHTON.